June 16, 1936. J. D'AGOSTINO 2,044,499
PISTON AND PISTON RING ASSEMBLY
Filed June 17, 1935 2 Sheets-Sheet 1
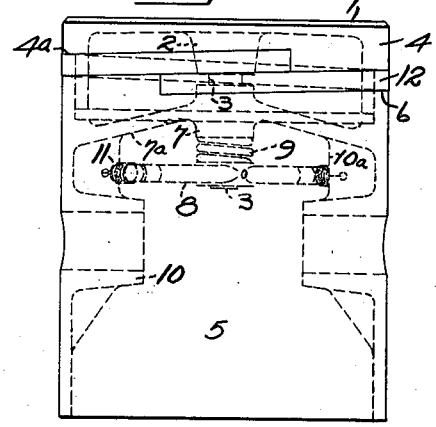
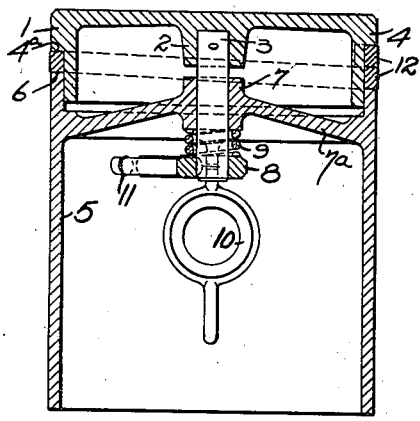
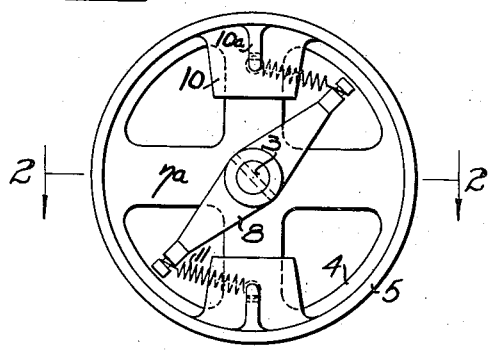
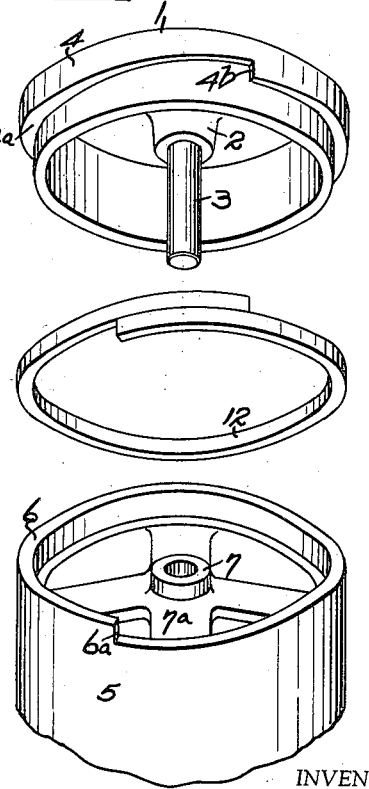
INVENTOR.
BY Julius D'Agostino June 16, 1936.   J. D'AGOSTINO   2,044,499
PISTON AND PISTON RING ASSEMBLY
Filed June 17, 1935   2 Sheets-Sheet 2

INVENTOR.
BY Julius D'Agostino

Patented June 16, 1936

2,044,499

UNITED STATES PATENT OFFICE 2,044,499

PISTON AND PISTON RING ASSEMBLY

Julius D'Agostino, Detroit, Mich.

Application June 17, 1935, Serial No. 27,007

12 Claims. (Cl. 309—30)

This invention relates to improvements in piston and piston ring assemblies. It is an object of the invention to provide a piston ring mounted in a helical groove formed around a piston periphery and having its extremities in overlapping relation, so that the gap which occurs between the adjacent ends of conventional rings, and through which fluid under pressure escapes is eliminated. Thus I aim to provide a piston and ring assembly wherein a single ring may be substituted for the plurality of rings now generally utilized; to effect a ring economy; reduce the cost of the piston; reduce the depth of the thick walled portion of the piston immediately beneath the head in which the ring grooves are formed and from which the skirt depends; to increase the efficiency of the ring; and to provide such an assembly wherein means are provided for compensating for wear.

Another object of the invention is to provide such a piston and ring assembly wherein spring means are provided within the piston for holding the upper extremity of the ring in contact with the adjacent extremity of the piston groove, thereby preventing the passage of fluid under pressure around the rear face of the ring. Moreover when the upper extremity of the piston ring and the opposed piston groove end wall are outwardly flared the spring pressure tends to force the ring peripherally outwards into more intimate contact with the cylinder wall.

A further object of the invention is to provide a piston wherein means are provided for contracting the width of the groove therein so that the sides of the latter remain in contact with the sides of the ring, to prevent leakage around the back of the latter.

Having thus briefly stated some of the major objects and advantages of the invention, I will now proceed to describe the same with the aid of the accompanying drawings, in which:

Figure 1 illustrates a side elevation of one form of the piston and piston ring.

Figure 2 is a section on the line 2—2 of Figure 3.

Figure 3 is an inverted plan of Figure 1.

Figure 4 is a perspective view showing the upper portion of the piston, the ring, and a part of the lower portion of the piston disassembled.

Figure 5:
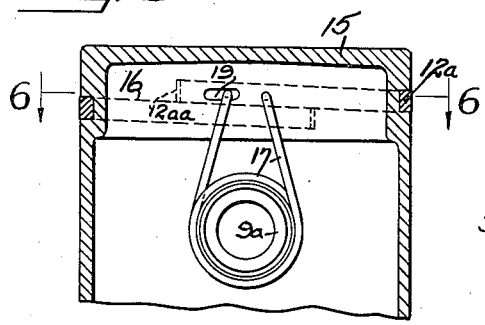
Figure 5 is a sectional view taken on the line 5—5 of Figure 6 showing a modified form of construction of my piston and ring.

Referring now to Figures 1 to 4 of the drawings, 1 designates a piston head having therein a downwardly projecting central boss 2 in which one extremity of a guide spindle 3 is suitably secured. Around the head 1 an annular flange 4 is provided, the lower extremity of which is of reduced diameter to form an intermediate annular shoulder 4a the face of which is helical. The lower piston portion or skirt 5 has a corresponding helical edge face 6 around its upper extremity. The bore of the upper portion of the skirt 5 is also such that the lower extremity of the head flange 4 is a sliding fit therein.

Supported as by a spider 7a within the skirt 5 adjacent the upper extremity thereof is a bearing 7 through which the spindle 3 extends and is axially movable. Fixed upon the lower extremity of the spindle 3 beneath the bearing 7 is a lever 8, and between the latter and the underside of the said bearing a spring 9 is arranged which tends to draw the piston head 1 down towards the skirt 5.

Conventional wrist pin bearings 10 are provided in the skirt 5 and extending upwardly from the said bearings to the spider 7a are reinforcing flanges 10a. 11 denotes springs which extend from the flanges 10a to the extremities of the lever 8 and tend to rotate the latter and with it the piston head 1 upon the skirt 5.

As will be clearly seen from Figure 4 the piston ring 12, which in this case is of uniform rectangular cross section throughout its entire length, is of helical form and extends through more than 360 degrees, and its overlapping extremities bear against one another. Again the walls 4b and 6a which terminate the helixes formed around the shoulder 4a and the edge face 6 of the skirt 5 respectively are parallel with the axis of the piston and extend partway across the path of the helical ring groove.

The tension of the coil spring 9 holds the head 1 in position on the skirt 5 and retains the shoulder 4a and the edge face 6 in contact with the upper and lower margins of the ring 12. In other words the spring 9 tends to reduce the width of the helical ring groove. The tension of the springs 11 tends to rotate the head 1 in such direction that the vertical walls 4b and 6a remain in contact with the ends of the piston ring 12, thereby preventing the passage of fluid under pressure between the said walls and the adjacent ring ends. The coil spring 9 also operates to retain the overlapping ring extremities in contact with one another, and prevents the passage of fluid under pressure around the rear of the ring by retaining the sides of the latter and the sides of the ring groove in contact.

Figure 6:
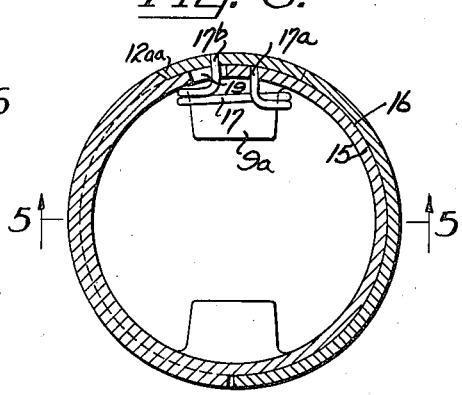
Figure 6 is a section on the line 6—6 of Figure 5.
Figure 7:
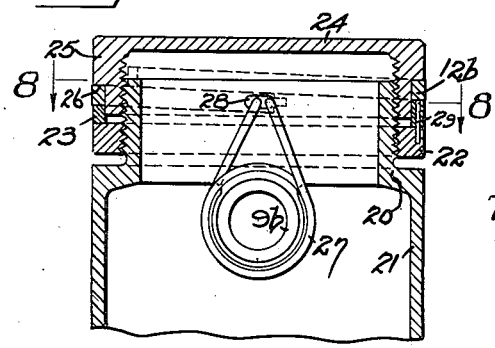
Figure 7 is a section on the line 7—7 of Figure 8 showing a further modification of the piston and ring assembly.
Figure 8:
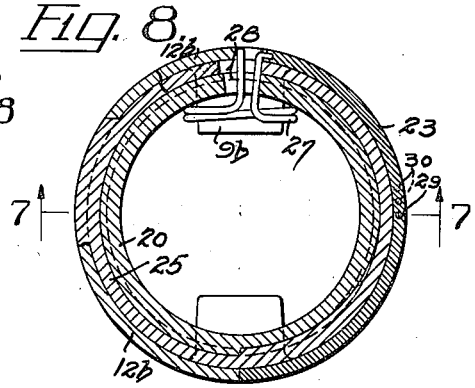
Figure 8 is a section on the line 8—8 of Figure 7.
Figure 9:
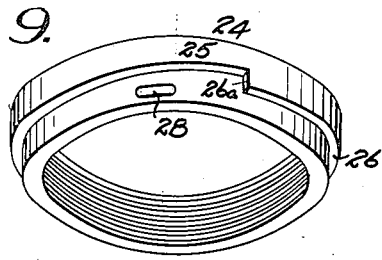
Figure 9 is a perspective view of the piston head showing Figures 7 and 8.
Figure 10:
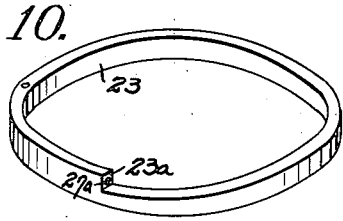
Figure 10 is a perspective view of the annular ring.

Referring now to the modification shown in Figures 5 and 6. In this case the piston 15 is of unitary construction and has a helical ring groove 16 formed around it to receive the ring 12a, which is similar to that shown in Figure 4. In order to retain the upper extremity 12aa of the ring 12a in contact with the transverse wall at the upper end of the groove 16, a spring 17 is provided. One extremity 17a of this spring is outwardly flexed to engage and be secured in an aperture formed in the piston; and the other extremity 17b of the spring extends through a slot 19 formed through the base of the groove 16, and projects into the ring 12a adjacent its upper extremity. Intermediately of its length the spring 17 may be arranged around one of the wrist pin bearings 9a, and is so made that it tends to urge the upper extremity 12aa of the ring against the upper end wall of the groove 16. It will be seen that this upper end, or transverse, wall and the coacting ring end 12aa are so tapered that the spring urges the ring outwardly into intimate contact with the cylinder wall (not shown).

In the further modification shown in Figures 7 to 10 inclusive another form of composite piston is shown with a similar ring thereon. In this case the upper portion 20 of the piston skirt 21 is of reduced diameter and externally threaded. Mounted upon the threaded portion 20 is an internally threaded collar 22 the circumference of which is substantially the same as that of the main portion of the skirt 21. Resting upon the upper edge face of the collar 22 is an annular support 23 the upper edge face of which is of helical form to provide a bearing for the underside of the helical piston ring 12b (again similar to the ring 12 shown in Figure 4) which rests thereupon. The piston head 24 has a downward annular flange 25 the outer extremity of which is of reduced diameter thereby forming an intermediate annular shoulder 26. The edge face of the latter is of helical form to bear against the upper side of the helical piston ring 12b. Thus a part of the lower portion of the flange 25 and the shoulder 26 form the base and one side respectively, and the helical edge face of the support 23 the other side, of a helical groove for the ring 12b.

The flange 25 is internally threaded to engage the upper threaded portion 20 of the skirt 21. This threaded portion 20 is of such length that the normal position of the threaded collar 22 is somewhat above the main portion of the skirt 21, thereby permitting variation in the width of the piston ring groove without altering the distance from the top of the piston head to the wrist pin bearings 9b, and therefore not affecting the compression ratio. In the vertical end wall 23a of the support 23 an aperture 27a is formed to receive one extremity of a spring 27 which is flexed to extend through a slot 28 formed through the upper portion 20 of the skirt 21 and also through the lower portion of the flange 25. The spring 27, intermediately of its length, is usually passed around one of the wrist pin bearings 9b and its opposite extremity passes again through the slot 28 and bears against the lower extremity of the piston ring 12b to exert rotary pressure thereagainst. It will be noted that when the spring is arranged as herein described that it tends to force the entire ring outwardly against the cylinder wall—not shown.—This construction is therefore advantageous when the size of the ring is slightly small for the bore of the cylinder in which it is to be used. At the same time this spring arrangement is also effective in retaining the upper extremity of the spring in contact with the upper transverse wall 26a to prevent leakage around the back of the ring.

Projecting downwardly from the annular support 23 is a dowel 29 which engages any one of a plurality of openings 30 formed in the contiguous face of the collar 22. Thus ready means is provided for setting the helical edge face of the support 23 relative to the helical face of the shoulder 26.

The spring 27, in urging the ring 12b rotatably in one direction, exerts a corresponding rotary pressure upon the support 23, and consequently upon the collar 22, in the opposite direction. The thread upon the upper portion 20 of the skirt 21 is so cut that as the collar is turned by the spring 27 the support approaches the piston head 24 and reduces the width of the piston ring groove. Thus the action of the spring 27 tends to retain the shoulder 26 and the upper face of the support 23 in constant engagement with the sides of the piston ring, thereby preventing the passage of fluid under pressure behind the base of the ring, and also holding the overlapping portions of the latter in contact with one another.

While in the foregoing the preferred embodiments of my invention have been described and shown, it is understood that further alterations and modifications may be made thereto, provided they fall within the scope of the appended claims.

What I claim as my invention and desire to secure by Letters Patent is:

1. A piston and ring assembly comprising a piston having a helical peripheral groove formed therearound, transverse walls bounding the extremities of said helical groove, and the base of the groove being slotted, a helical piston ring having overlapping extremities in contact with one another, and a spring mounted upon the piston, one extremity of the spring extending through said slot and engaging the ring to urge one extremity of the latter into contact with one of said transverse walls.

2. In a piston and ring assembly, the combination set forth in claim 1, wherein means are provided for urging the sides of the piston grooves into engagement with the edge faces of the ring.

3. A two-piece piston comprising a skirt having its upper extremity of reduced diameter and externally threaded, a piston head, an annular flange thereon mounted upon the reduced portion of the skirt, the lower outer periphery of the flange being of reduced diameter to form a shoulder the face of which is helical, a collar in threaded engagement with the skirt, and a support thereon the upper edge face of which is of helical form, said support being spaced beneath the helical face of the shoulder so that an annular helical groove is formed between them to receive a helical piston ring.

4. A two-piece piston comprising the combination set forth in claim 3 wherein a piston ring is mounted in the annular groove and spring means are provided for urging the piston ring longitudinally towards one extremity of the helical groove.

5. A two-piece piston comprising the combination set forth in claim 3 wherein spring means are provided for urging the collar rotatably around the skirt thread to reduce the distance between the opposite sides of the annular helical groove.

6. A two-piece piston comprising a skirt having its upper extremity of reduced diameter and externally threaded, a piston head, a depending annular flange on said head internally threaded to engage the skirt thread, the outer extremity of the flange being of reduced diameter to form a shoulder around the flange, the face of the shoulder being helical, a collar in threaded engagement with the skirt, a support on the collar having its outer edge face helical, said support being spaced from the helical face of the shoulder so that an annular helical groove is formed between them, a helical piston ring mounted in and around said groove, and a spring having one extremity mounted in the support and its opposite extremity connected to the piston ring, said spring tending to force one end of the ring against the end of the annular groove and also tending to turn the support and collar about the skirt thread to reduce the transverse width of the groove.

7. In a piston and ring assembly, the combination set forth in claim 1 wherein means are provided cooperating with the spring for automatically reducing the width of the piston groove to bring the sides of the latter into contact with the edge faces of the ring.

8. In a piston and ring assembly the combination set forth in claim 1 wherein one transverse piston groove wall and the contacting end face of the piston ring are correspondingly radially inclined so that pressure exerted by the spring to retain the end face of the ring in contact with said wall, also tends to force the ring end outwardly along said wall.

9. A piston and ring assembly comprising a piston having a helical groove formed around its periphery, transverse walls bounding the extremities of said groove, the base of the groove being slotted, inwardly projecting wrist pin bearings in said piston, a helical piston ring having overlapping extremities the adjacent lateral margins of which are in contact with one another, a spring the intermediate portion of which is mounted around one of the wrist pin bearings, one extremity of the spring engaging the ring and urging one extremity of the latter into contact with the transverse wall adjacent thereto, and the opposite spring extremity being in engagement with the piston.

10. A piston and ring assembly comprising a piston having a helical groove formed around its periphery, transverse walls bounding the extremities of said groove, the base of the groove being slotted, inwardly projecting wrist pin bearings in said piston, a helical piston ring having overlapping extremities the adjacent lateral margins of which are in contact with one another, a spring mounted around one of the wrist pin bearings, and one extremity of the spring engaging the ring and urging one extremity of the latter into contact with the transverse wall adjacent thereto.

11. In a piston and ring assembly, the combination set forth in claim 10 wherein means are provided cooperating with the spring automatically holding the sides of the piston groove in contact with the edge faces of the ring.

12. A piston and ring assembly comprising a piston, a piston head thereon having one side and the base of a helical piston ring groove formed around its outer periphery, a support mounted upon said piston so that one edge face thereof forms the other side of the helical piston ring groove, transverse walls formed in said head and said support limiting the extremities of said groove, a helical piston ring having overlapping ends mounted in said groove, a spring mounted in said piston and engaging said ring and support, said spring tending to retain one extremity of the ring in contact with one transverse wall, and also to retain the support so positioned relative to the head that the opposite sides of the ring groove contact the edge faces of the piston ring.

JULIUS D'AGOSTINO.